Aug. 19, 1958

M. TRESHOW 2,848,404

NEUTRONIC REACTOR

Filed Aug. 2, 1956

INVENTOR.
Michael Treshow
BY
Roland A. Anderson
Attorney

Aug. 19, 1958 M. TRESHOW 2,848,404
NEUTRONIC REACTOR
Filed Aug. 2, 1956 6 Sheets-Sheet 3

INVENTOR.
Michael Treshow
BY
Roland A. Anderson
Attorney

Aug. 19, 1958

M. TRESHOW 2,848,404

NEUTRONIC REACTOR

Filed Aug. 2, 1956

INVENTOR.
Michael Treshow
BY
Roland A. Anderson
Attorney

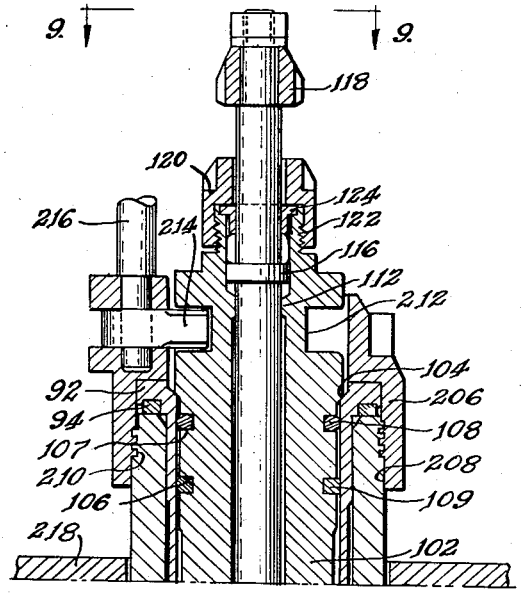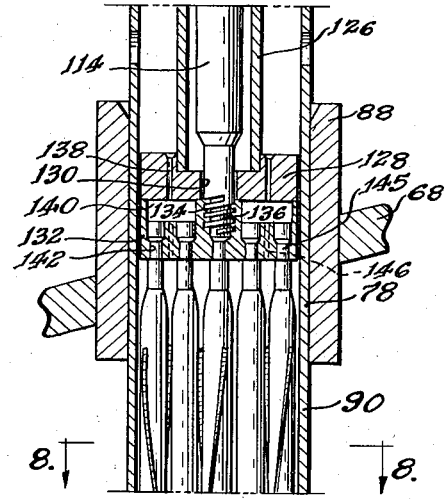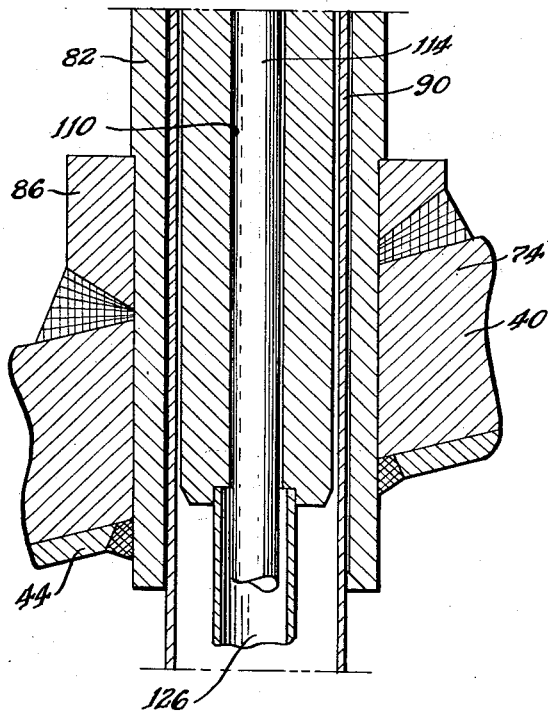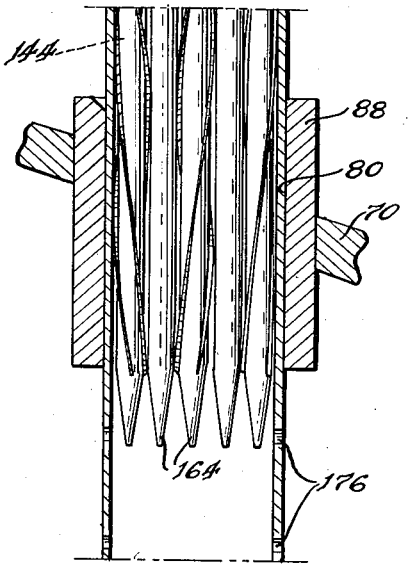

Aug. 19, 1958

M. TRESHOW 2,848,404

NEUTRONIC REACTOR

Filed Aug. 2, 1956

INVENTOR.
Michael Treshow
BY
Roland A. Anderson
Attorney

United States Patent Office 2,848,404
Patented Aug. 19, 1958

2,848,404

NEUTRONIC REACTOR

Michael Treshow, Hinsdale, Ill., assignor to the United States of America as represented by the United States Atomic Energy Commission Application August 2, 1956, Serial No. 601,845

3 Claims. (Cl. 204—193.2)

The present invention relates to neutronic reactors, particularly reactors for the production of power.

As a neutronic reactor operates, the fissionable material in the reactor depletes, and after the lapse of a period of time ranging, in general, from days to years of operation, the fissionable material in the reactor must be replaced in order to regain sufficient reactivity to continue the neutronic chain reaction. The duration of the operating period before fuel replacement is required in order to restore reactivity depends upon the excess reactivity initially built into the reactor.

For most power reactors, the excess reactivity initially built into the reactor is relatively small. This is largely due to the fact that the mass of fissionable isotope in the reactor structure constitutes a substantial cost item, and there is an economic disadvantage in including a large fissionable isotope mass in a power producing reactor. Also, reactors having relatively small excess reactivities are considered safer to operate, since power excursions rapidly dissipate the excess reactivity of such reactors limiting the damage which such an excursion can cause.

Heterogeneous power reactors are thus generally constructed with interchangeable fuel elements containing fissionable material. The period of time required to remove depleted fuel elements and replace them with new fuel elements is lost for power production, and hence must be minimized. It is one of the objects of the present invention to provide a heterogeneous neutronic reactor with replaceable fuel elements in which the fuel elements may be replaced in a shorter period of time than has been practical in reactors previously employed.

More specifically, it is an object of the present invention to provide a neutronic reactor with a plurality of parallel channels in which fuel elements may be inserted into one end of these channels and withdrawn from the other end of the channels.

Additionally, it is an object of the present invention to provide novel closures for the insertion and withdrawal ends of the channels which position the fuel elements within the reactor during operation and release the fuel elements for withdrawal for the discharge operation.

Further, it is an object of the present invention to provide a fuel element which is inexpensive to fabricate and process, readily cooled, and mechanically adapted for insertion into the channels of the reactor from one end and withdrawal from the channels of the reactor from the opposite end thereof.

These and additional objects of the invention will be readily apparent to those skilled in the art from a further reading of this disclosure, particularly when viewed in the light of the drawings, in which:

Figures 5, 6 and 7 are enlarged fragmentary vertical sectional views of portions of one of the fuel elements shown generally in Figure 2;

Figure 1:
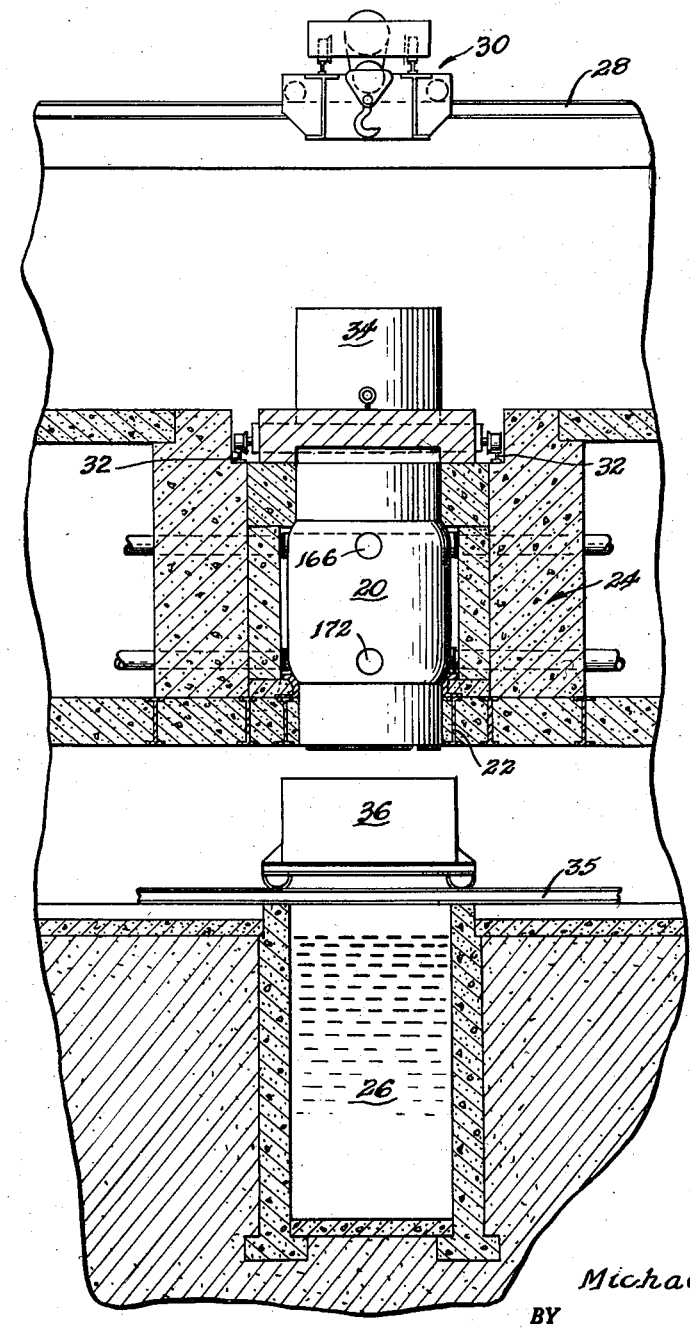
Figure 1 is a vertical sectional view of a reactor structure constructed according to the teachings of the present invention.

Referring to Figure 1, the pressure vessel 20 is mounted upon I-beams 22 of a mounting structure 24, and is disposed immediately above a canal 26 which contains water. Another beam 28 supports a crane 30 above the pressure vessel 20 which is employed to facilitate fuel loading of the reactor. A pair of tracks 32 are mounted to the mounting structure 24 above and on opposite sides of the pressure vessels 20 to permit a track riding truck 34 to be positioned over the pressure vessel 20. A second pair of tracks 35 are disposed directly above the canal 26 and beneath the pressure vessel 20 to enable a track riding car 36 to be positioned directly beneath the pressure vessel 20. The car 36 is employed to position remote operating equipment for discharging the reactor.

Figure 2:
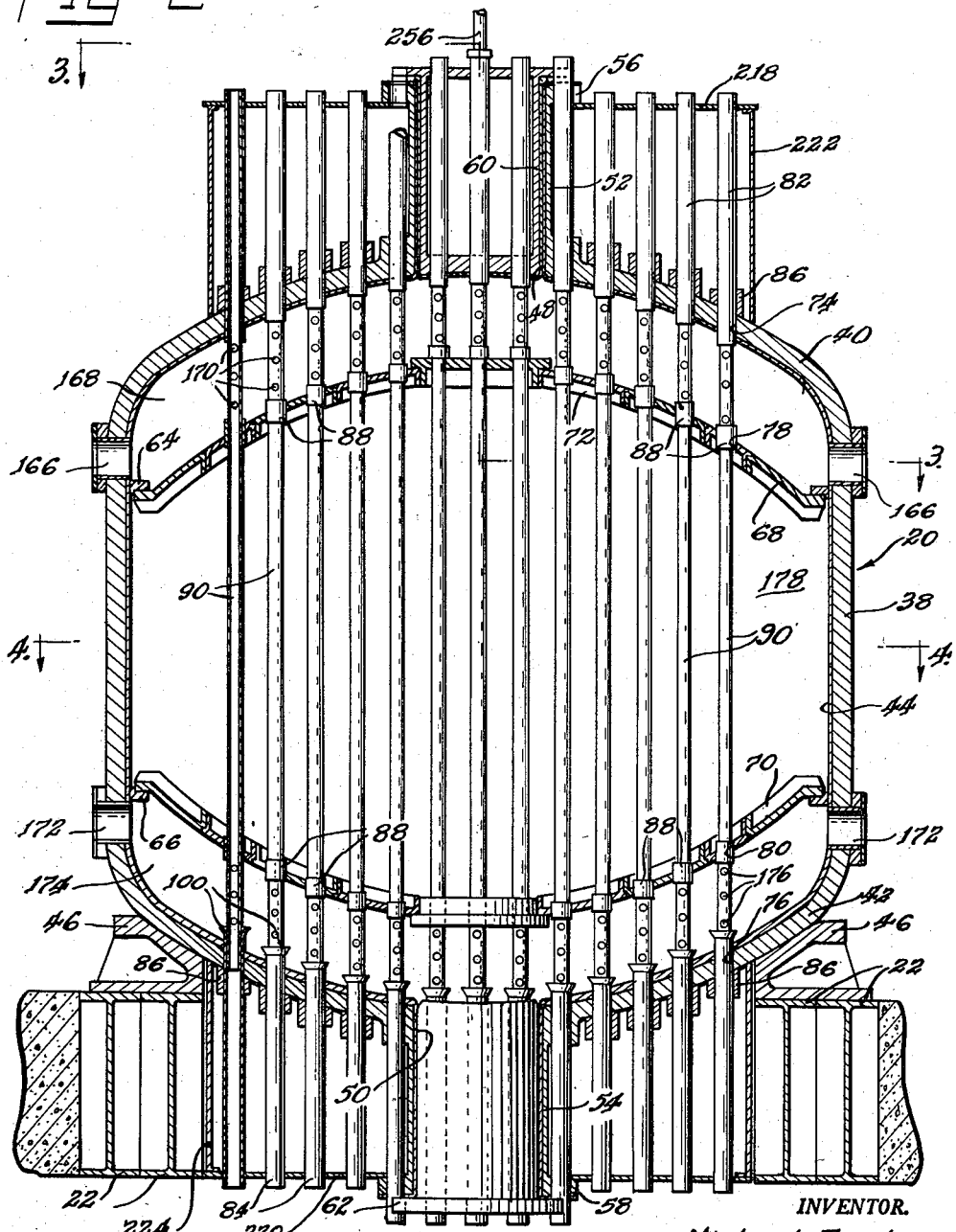
Figure 2 is a vertical sectional view of the reactor illustrated in Figure 1.
Figure 3:
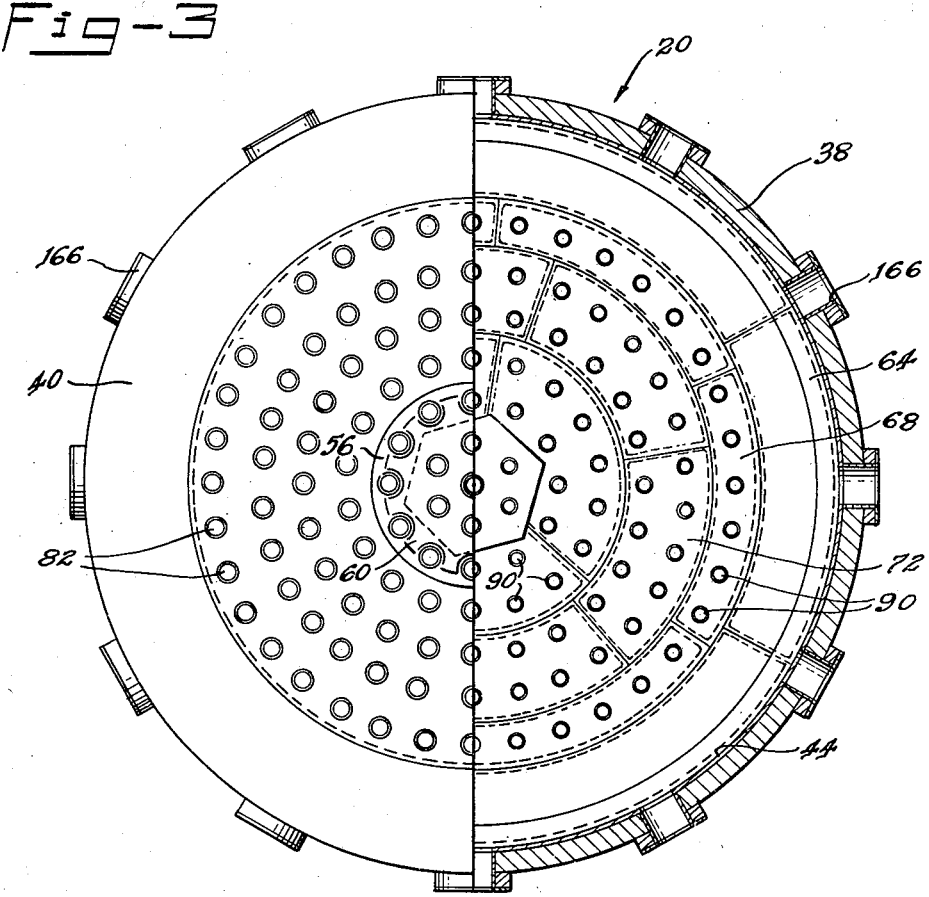
Figure 3 is a sectional view taken along the line 3—3 of Figure 2.
Figure 4:
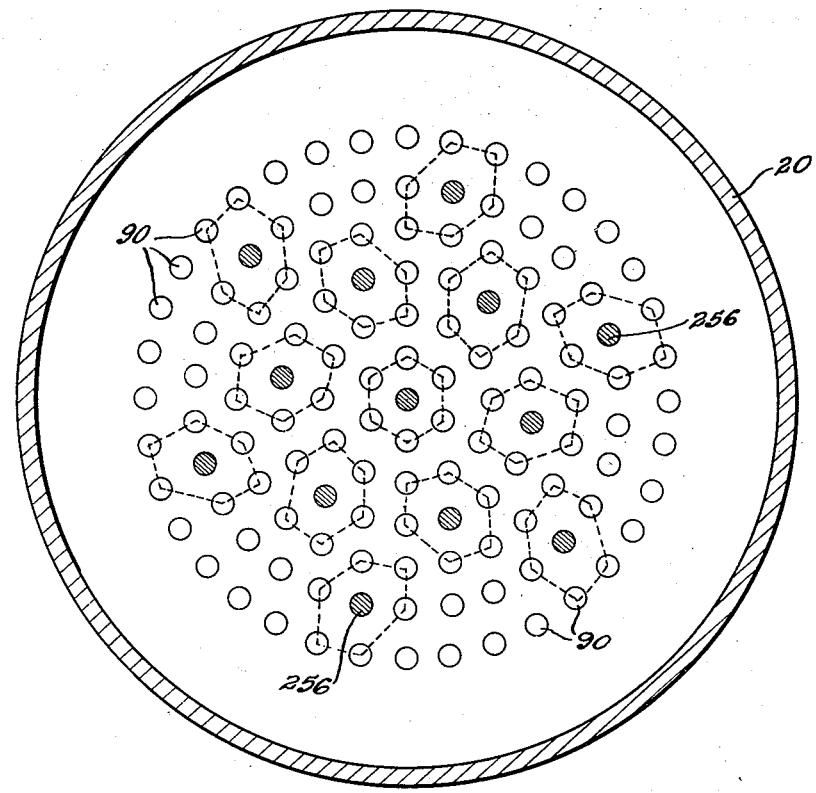
Figure 4 is a diagrammatic sectional view taken along the line 4—4 of Figure 2.
Figure 9:
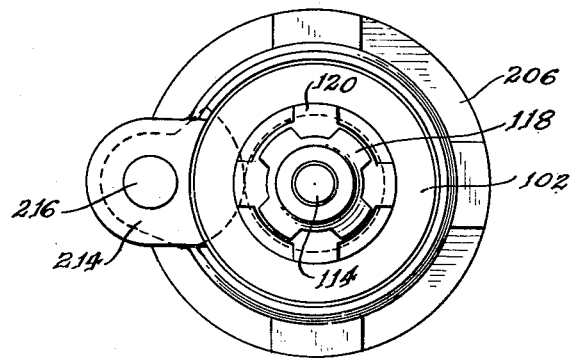
Figure 9 is a plan view of one of the fuel elements of the reactor taken along the line 9—9 of Figure 5.

As illustrated in Figures 2, 3 and 4, the pressure vessel 20 has a cylindrical portion 38 with dished heads 40 and 42 sealed to the ends of the cylindrical portion 38. The pressure vessel 20 is constructed of steel and provided with a stainless steel liner 44 on its interior surface. The cylindrical portion 38 of the pressure vessel 20 has a diameter of 11′ 6″ and a thickness of 4″ including the stainless steel liner 44.

The lower dished head 42 is provided with a mounting bracket 46 which is welded thereto and abuts the I-beams 22. Both of the dished heads 40 and 42 are provided with axial openings 48 and 50, which in the particular construction are 24 inches in diameter, to permit access to the interior of the pressure vessel 20. Cylindrical walls 52 and 54 extend outwardly from the openings 48 and 50, respectively, and terminate in flanges 56 and 58. Covers 60 and 62 are sealed within the walls 52 and 54, respectively, to seal the heads 40 and 42 of the pressure vessel 20.

A pair of spaced annular flanges 64 and 66 extend into the pressure vessel from the cylindrical portion 38 thereof, and a pair of partitions 68 and 70 are secured to the flanges 64 and 66, respectively. The partitions 68 and 70 are constructed of segments 72 which are sufficiently small to be inserted into the pressure vessel 20 through the openings 48 and 50, and there assembled into the generally semispherical shaped partitions 68 and 70. The partitions 68 and 70 are constructed of material with a low neutron capture cross section, preferably a capture cross section no greater than zirconium and in the present construction, zirconium.

The dished heads 40 and 42, and the partitions 68 and 70 are provided with a plurality of aligned openings 74, 76, 78 and 80, respectively. Sleeves 82 and 84 extend outwardly from the openings 74 and 76 in the heads 40 and 42, reinforcing collars 86 being employed between the sleeves 82 and 84 and the heads 40 and 42. Reinforcing collars 88 are also employed within the openings 78 and 80 in the partitions 68 and 70, respectively.

Each aligned group of openings 74, 76, 78 and 80 has a tube 90 extending therethrough. The tube 90 is provided with an outwardly extending flange 92 which abuts the upper end of the sleeve 82, and is thereby suspended. A gasket 94 is disposed between the end of the sleeve 82 and a confronting flange 92 of the tube 90. The tube 90 is cylindrical and constructed of zirconium. The lower end of the tube 90 fits slidably about the recessed annular end 96 of a centering pin 98 disposed within the sleeve 84. The sleeve 84 is provided with an outwardly flaring upper end 100 to guide the tube 94 over the end 96 of the centering pin 98.

A plug 102 is inserted into the flanged end of each of the tubes 90, and is provided with an outwardly extending shoulder 104 which abuts the flanged end of the tube 90 to restrict motion of the plug 102 into the tube 90. The plug 102 is provided with a pair of spaced grooves 106 and 107 about its perimeter. An O-ring 108 is disposed within the upper groove 107 and a stainless steel piston ring 109 is disposed in the lower groove 106 to form a fluid tight seal between the plug 102 and the tube 90. The plug 102 is also provided with an axial bore 110 which extends therethrough. The bore 110 has an inwardly protruding seat 112 which forms a bearing surface for a cylindrical spindle 114 which extends through the bore 110. The spindle 114 has a collar 116 which abuts the seat 112 to limit translation of the spindle 114 within the bore 110. The end of the spindle 114 is provided with a head 118 with an X-shaped cross section to permit engaging the spindle with a wrench for delivering torque to the spindle. Also a cap 120 engages the threaded end 122 of the plug 102 to compress a seal 124 and prevent seepage of liquid through the plug 102.

A cylinder 126 is secured to the lower end of the plug 102 coaxially with the bore 110 thereof, and the cylinder 126 extends to a disc 128 which is secured thereto. The disc 128 has an axial bore or opening 130 to permit passage of the spindle 114. A second disc 132 confronts the first disc 128 and is provided with a threaded recess 134 on its axis which engages the threaded end 136 of the spindle 114. It is thus clear, that rotation of the spindle 114 will cause the second disc 132 to securely and firmly abut the first disc 128.

The discs 128 and 132 are mounted in each of the tubes 90 on a plane approximately traversing the partition 68. The first disc 128 is provided with a plurality of orifices 138 which are disposed about the axis of the disc 128 to permit and to limit the flow of coolant heavy water therethrough. The second disc 132 has an annular recess 140 disposed about the axis confronting the orifices 138. In addition, the second disc 132 has nineteen bores 142 which extend therethrough for mounting nineteen strands 144 of fissionable material. The strands 144 having protruding ends 145 which are secured within the bores 142. A plurality of orifices 146 are disposed in the second disc 132 between the bores 142 and extend from the recess 140 confronting the first disc 128. The orifices 138 and 146 together limit the flow of water through the tubes 90 to the strands 144 of fissionable material.

Figure 8:
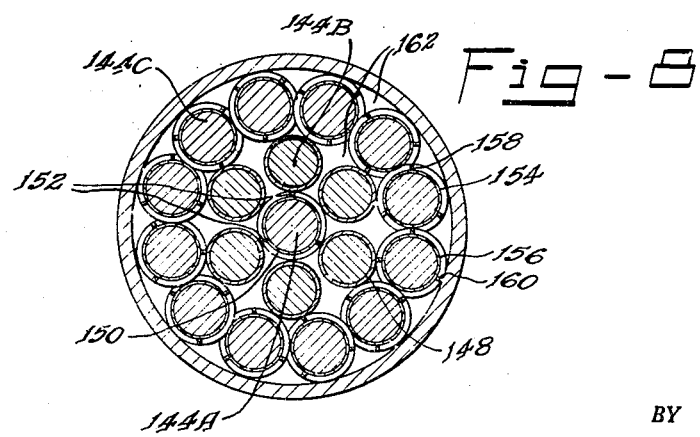
Figure 8 is a sectional view taken along the line 8—8 of Figure 6.

One of the strands 144A is disposed on the axis of the tube 90. This strand 144A is surrounded by a group of six strands 144B, and this group of six strands is surrounded by a group of 12 strands 144C. The strands 144A, 144B and 144C are of identical construction. The strands 144B intermediate the axial strand 144A and the outer group of strands 144C are provided with leak tight cylindrical jackets 148. The axial strand 144A has a jacket 150 sealed thereabout cylindrical in shape and provided with three equally spaced ribs 152 which extend helically about the strand 144A. In like manner, the strands 144C in the outer group are provided with two types of jackets 154 and 156 which are both cylindrical in shape and are each provided with three ribs 158 and 160, respectively. Adjacent strands 144C have jackets of different types. As viewed in Figure 8, the ribs 158 extend about the jackets 154 in a clockwise helical path, and the ribs 160 extend above the jackets 156 in a counter clockwise helical path. As a result of the ribs 158 being in a helical path the reversed to that of the ribs 160, the jackets 154 and 156 each abut the ribs of the other placing the jackets at a distance no less than the height of the ribs, and the ribs do not interfere with each other or the assembling of the fuel strands 144. In addition, the ribs 158 and 160 space the strands 144C in the outer group relative to the tube 90, and also abut the cylindrical jackets 148 of the strands 144B in the central group. These strands 144B are maintained in position by abutting the ribs 158 and 160 of the jackets 154 and 156 on one side, and the ribs 152 of the jackets 150 of the axial strand 144A on the other side. In this manner, annuli for the passage of coolant water, designated 162, are disposed between fuel strands 144 and between the strands 144 and the tube 90.

The fuel strands 144 extend between the partitions 68 and 70, and the jackets and the fuel strands extend below the partitions 70 to terminate in streamlines or pointed ends 164 in order to permit the coolant flow to recover velocity pressure after passing through the annuli 162.

The pressure vessel 20 is provided with twelve inlet ports 166 spaced about its periphery and communicating with the region between the partition 68 and the head 40 of the pressure vessel 20, this region forming an inlet plenum chamber 168. Each of the tubes 90 is provided with a plurality of apertures 170 in the inlet plenum chamber 168 to permit coolant entering the plenum chamber to flow into the tubes 90. In like manner, the pressure vessel 20 has twelve outlet ports 172 spaced about its periphery communicating with the region between the partitions 70 and the head 42, this region forming an outlet plenum chamber 174. Each of the tubes 90 is also provided with apertures 176 in the region of the outlet plenum chamber 174 to permit the coolant flow to exit from the tubes 90 into the outlet plenum chamber 174, and hence through the outlet ports 172.

Heavy water is employed as both moderator and coolant for the reactor and entirely fills the pressure vessels 20, as indicated by the reference numeral 178.

The tubes 90 merely fit reasonably snug within the collars 88, thereby permitting leakage of heavy water from the plenum chambers 168 and 174 into the region of the pressure vessel between the two partitions 68 and 70. In this manner there is a continuous flow of heavy water through the pressure vessel and the entire pressure vessel is maintained completely filled with heavy water at all times. Since the partitions 68 and 70 are constructed of zirconium, thus permitting neutrons to pass freely between the plenum chambers 168 and 174 and the region between the partitions 68 and 70, the plenum chambers 168 and 174 serve as reflectors as well as plenum chambers.

It is of course extremely important to provide closures for the open ends of the sleeves 82 and 84 which will prevent the leakage of heavy water from the reactor. At the bottom of the reactor, the sleeves 84 are provided with square threads 180 thereabout adjacent to their ends, and caps 182, each having a cylindrical threaded opening 184, engage the threaded ends 180 of the sleeves 84. Each cap 182 is provided with an axial bore 186, and a cylindrical shaft 188 of a plug 190 extends through the bore 186. The plug 190 has a flange 192 extending outwardly therefrom and confronting the end of the sleeve 84, this confronting surface being provided with a groove 194 which accommodates a ring 196 confronting and abutting the end of the sleeve 84. An annular spring 198 is disposed in an indentation 200 adjacent to the ring 196 and prevents the ring 196 from falling from the plug 190 when the plug is removed from the sleeve 84. A cap 202 is threaded into an indentation 204 in the end of the shaft 188 to prevent the plug 190 from becoming detached from the cap 182 when removed from the reactor. The plug 190 abuts the centering pin 98 and maintains it in position within the sleeve 84.

The outer ends of the sleeves 82 are also maintained sealed by caps 206 having open ends 208 which engage threads 210 adjacent to the ends of the sleeves 82. The plugs 102 have grooves 212 adjacent to the ends of the caps 206, and spiral keys 214 rotatably mounted on shafts 216 engage the plugs 102 within the grooves 212 to lock the caps 206 in place.

In order to replace the fuel elements within the reactor, the reactor is shut down and the heavy water permitted to drain from the reactor pressure vessel 20. The car 36 bearing remotely actuated wrenches for removing the closures on the sleeves 84 is then positioned beneath the pressure vessel of the reactor and the caps 182 and centering pins 98 removed from the reactor. The car 36 is then rolled away on the track 35 from the region beneath the pressure vessel 20. Next, the caps 120 about the spindles 114 are loosened permitting rotation of the spindles 114, and the spindles 114 are rotated in a counterclockwise direction to release the second plate 132. As a result, the strands 144 of fuel material fall into the canal 26. Next, the caps 206 spindles 114 and the plugs 102 are removed from the sleeves 82 together with the first discs 128. These assemblies are then secured to new fuel sections including strands 144 of fissionable material and new second discs 132 by engaging the spindles 114 in the threaded recesses 134 of the new fuel assemblies. The plugs 102 are reinserted and the caps 206 again secured in position. In like manner, the caps 182 are again engaged with the sleeves 84 below the reactor after reinserting the centering pins 98. The reactor is then refilled with heavy water and the neutronic chain reaction may again be established.

The sleeves 82 and 84 extend outwardly from the heads 40 and 42 and are loosely journaled in annular support plates 218 and 220, respectively. The support plates 218 and 220 are secured to the heads 40 and 42 by cylinders 222 and 224, respectively, secured to the heads 40 and 42 and to the periphery of the support plates 218 and 220, respectively. As a result of this construction, thermal expansion of the sleeves 82 and 84, or other causes do not create stresses.

Figure 7:
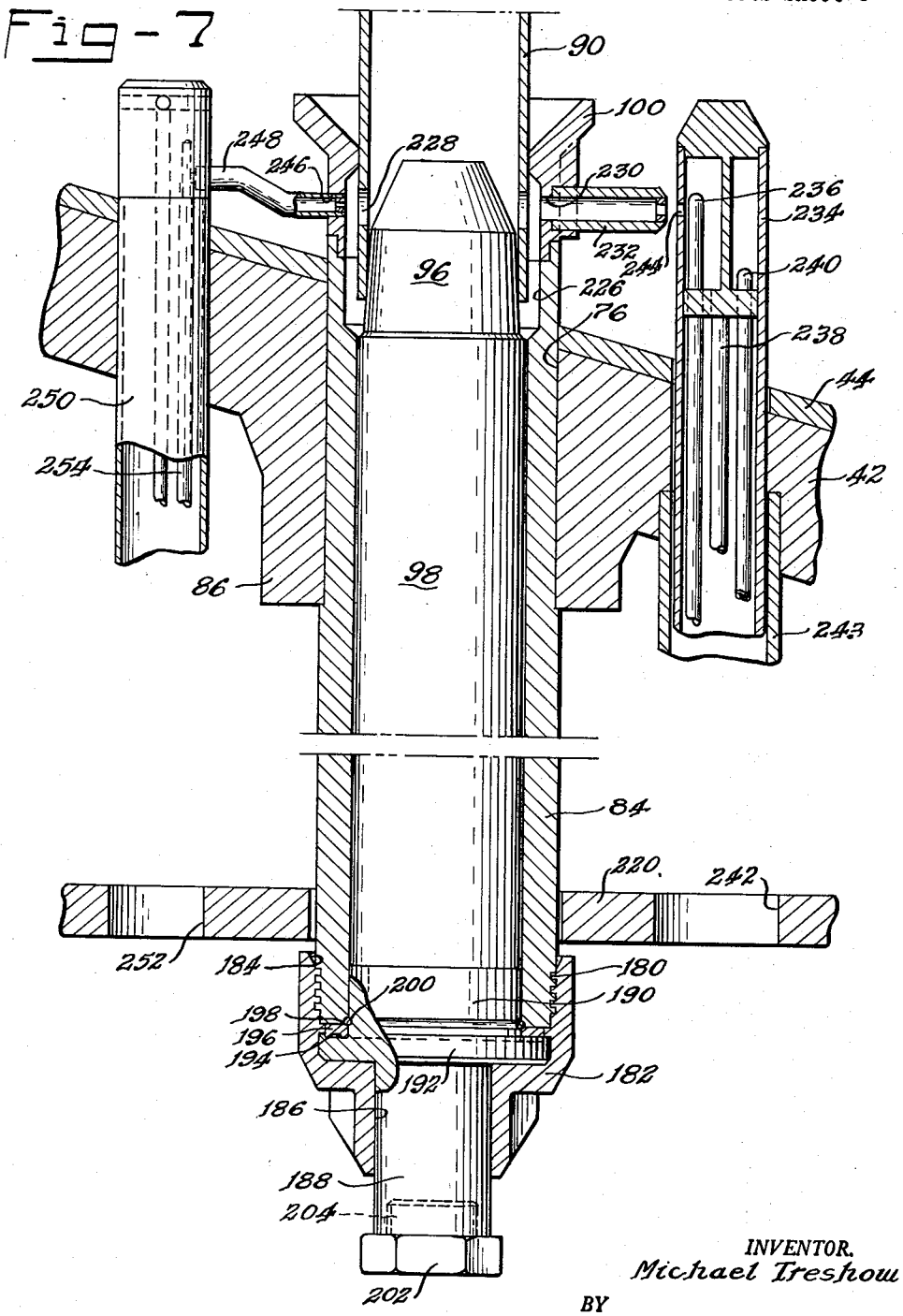

It is desirable to avoid disconnecting and reconnecting hydraulic or electrical leads from monitoring coolant flow rate and temperatures each time the fuel complement of a reactor is replaced. Figure 7 illustrates monitoring devices constructed in the present reactor which do not hinder refueling of the reactor. Each of the sleeves 84 is provided with a recess 226 adjacent to the flared end 100 thereof. Each of the tubes 90 is provided with a plurality of orifices 228 confronting this recess 226 and permitting the heavy water coolant flowing down the tubes 90 to enter into the recess 226. The sleeve 84 is provided with an aperture 230 which accommodates a nozzle 232 extending outwardly from the sleeve 84. A tubular member 234 containing three thermocouples 236, 238, and 240 is disposed confronting the nozzle 232 and extends through the head 42 of the pressure vessel 20 and an aperture 242 in the support plate 220. The member 234 is sealed within sleeve 243 and is removable therethrough. The sleeve 243 is sealed within the head 42 of the pressure vessel 20, and the member 234 is provided with an aperture 244 confronting the nozzle 232 and the thermocouple 236. As a result, heavy water is sprayed from the nozzle 232 onto the thermocouple 236 to permit measurement of the temperature at this point. Also, the member 234 may be removed from the reactor through the sleeve 243 without disconnecting it from any portion of the sleeve 84.

The sleeve 84 also has an aperture 246 on the opposite side of the recess 226 from the aperture 230, and a tube 248 is sealed within the aperture 230 and extends to a second tubular member 250. The tubular member 250 is sealed within the head 42 of the pressure vessel and extends through an aperture 252 in the support plate 220. The member 250 contains tubes, 254, one of which is connected to the tube 248 to conduct a portion of the heavy water exterior to the pressure vessel 20 for flow monitoring purposes. It is to be noted that both of the tubular members 234 and 250 contain the equipment for monitoring three adjacent tubes 90 within the pressure vessel, thereby economizing on the number of tubular members which must traverse the head 42 of the pressure vessel 20.

The reactor employs lumped geometry with an unbonded hexagonal lattice system, that is, one control rod designated 256 is disposed at approximately the center of six approximately equal spaced fuel elements which are designated by the tubes 90. This arrangement is shown in Figure 4, the dashed lines indicating the hexagonal lattice system. One of the control rods 256 is disposed on the axis of the pressure vessel 20, and all of the other lattice positions are located on concentric circles with 8 inch differences in radii about this axis. The lattice positions also fall in straight lines every 60 degrees. The two concentric circles disposed about the axis of the pressure vessel 20 contain only fuel elements, six and twelve, respectively, but the third concentric circle contains six control rods 256 and twelve fuel assemblies. The following, or fourth, concentric circle contains only fuel elements, twenty-four in all, and the fifth concentric circle contains six control rods and twenty-four fuel assemblies. All in all, there are 114 fuel assemblies and 13 control rods in the reactor. It is to be noted that the outer two concentric circles of lattice positions contain fuel assemblies which are not grouped or clustered with control rods.

The control rods 256 are also disposed within the tubes 90, and a coolant flow is permitted through these control rod tubes 90 from the plenum chamber 168 to the plenum chamber 174 in a manner similar to the fuel assemblies. The closures on the sleeves 84 are the same as though used for the fuel assemblies. Further, the closures of the sleeves 82 which contain control rods 256 are similar to those employed with the fuel assemblies, the control rod 256 replacing the spindle 114 and the collar 116 being omitted. Drive mechanisms for the control rods 256 have not been illustrated, since they are well known in the art.

The following table sets forth details of the reactor heretofore described.

*Table of materials and dimensions*

Pressure vessel 20:
    Inner diameter—11 feet 6 inches
    Maximum inner height—12 feet
    Thickness—3¾ inches
    Material—steel
Pressure vessel liner 44: ¼ inch stainless steel
Partitions 68 and 70—zirconium:
    Distance from dished heads 40 and 42—1 foot 4 inches
    Maximum distance between partitions 68 and 70—9 feet 4 inches
    Minimum distance between partitions 68 and 70—5 feet
Minimum distance of fuel strand surfaces from pressure vessel—16 inches
Diameter of active region of reactor—8 feet 3 inches
Average height of active region of reactor—8 feet 6 inches
Mass of uranium in reactor—1,193 kg. (natural isotopic distribution)
Tubes 90:
    Outer diameter—3 inches
    Material—Zirconium
    Thickness—0.2 centimeter
Number of tubes 90—127
Number of tubes 90 containing fuel strands 144—114
Number of tubes 90 containing control rods 256—13
Number of strands 144 in each fuel assembly—19
Diameter of each fuel strand 144—12 millimeters
Material for jackets 148, 150, 154 and 156—zirconium
Thickness of jackets—0.020 inch Rib dimensions on jackets 150, 154 and 156—1.5 millimeters by 1.5 millimeters, in a helix of one turn per 9 inches Control rod 256 material—cadmium in a jacket of zirconium Control rod dimensions—diameter 1½ inches, length 9 feet Moderator and coolant—heavy water Average operating pressure in pressure vessel 20—600 pounds per square inch Heat generation—100 to 150 megawatts The fuel assemblies here disclosed may of course be employed in reactors of other designs and constructed of other materials than here described. For example, the fuel elements 146 of the reactor disclosed in the patent application of Samuel Untermyer, entitled "Neutronic Reactor," Serial No. 500,706, filed April 11, 1955, may be replaced by the fuel assemblies here disclosed, employing aluminum for the tube 90 and jackets 148, 150, 154 and 156, and uranium for the strands 144, the ratio of aluminum to uranium and the amount of uranium in each fuel assembly being maintained the same as in the construction described in the Untermyer application.

It is thus clear, that many modifications and designs may be devised which are within the scope of this invention. It is therefore intended that the scope of the invention be not limited by the foregoing disclosure, but rather only by the following claims.

What is claimed is:

1. A neutronic reactor comprising a pressure vessel having a hollow portion and first and second heads sealed to each end at the hollow portion, said heads being provided with confronting openings, a sleeve sealed within each of the openings in the heads and extending outwardly from the pressure vessel coaxially with the axis of confronting openings, a fuel element disposed within each pair of confronting openings in the pressure vessel including a tube disposed in each sleeve in the first head having an outwardly extending flange abutting the outer end of the sleeve, a plurality of strands of thermal neutron fissionable material releasably mounted within each of the tubes, means disposed within the flanged end of the tube to seal each of the tubes, said strands being arranged in a plurality of concentric groups about one strand disposed on the axis of the tube, said axial strand and each alternate group of strands being provided with protective jackets having helical ribs on the exterior surfaces thereof, and the intermediate groups of strands having cylindrical protective jackets abutting the ribs of the confronting jackets in the adjacent groups, and removable means disposed within the sleeves of the second head to seal the sleeves to the passage of liquid, whereby the sleeve sealing means in the sleeves of the second head may be removed and the strands released to permit removal through the sleeves of the second head.

2. A fuel element for a neutronic reactor comprising a cylindrical tube, nineteen cylindrical strands of material fissionable by thermal neutrons disposed within the tube, one of said strands being disposed about the axis of the tube and the other stands being arranged in two groups coaxially disposed about the axial strand, a jacket disposed about the axial strand with three helical ribs extending thereabout, cylindrical jackets disposed about the group of strands adjacent to the axial strand and abutting the ribs of the jackets of the axial strand, jackets disposed about each of the strands in the outer group having three helical ribs extending thereabout the ribs of adjacent jackets in said outer group being wound thereabout in opposite directions.

3. A neutronic reactor comprising a pressure vessel having a hollow cylindrical portion and dished heads sealed to each end of the cylindrical portion, a partition constructed of material having a neutron capture cross section no greater than zirconium spaced from each of the dished heads and sealed to the cylindrical portion of the pressure vessel forming plenum chambers between each of the portions and the confronting head, said pressure vessel being provided with ports communicating with the two plenum chambers, and the dished heads and partitions having a plurality of spaced openings aligned with the axis of the pressure vessel, a sleeve sealed within each of the openings in the heads of the pressure vessel and extending outwardly from the pressure vessel parallel to the axis thereof, a collar sealed within each of the openings in the partition, a plurality of fuel elements disposed in the aligned sleeves and collars, each of the fuel elements having a tube of zirconium with an outwardly extending flange abutting the remote end of one of the sleeves secured to one of the heads and each of the tubes being provided with apertures in the two plenum chambers, 19 cylindrical strands of uranium with the isotopic content found in nature disposed parallel to each other in each of the tubes between the partition of the pressure vessel, one of the strands in each tube being on the axis of the tube and surrounded by six other strands which are in turn surrounded by the 12 remaining strands, a cylindrical zirconium jacket disposed about each of said strands, the jackets of the axial strand and the twelve outer strands being provided with helical ribs disposed thereabout and the ribs of adjacent jackets on the twelve outer strands being wound thereabout in opposite directions, the cylindrical jackets of the strands between the axial and outer strands abutting the ribs of the jackets of the axial and outer strands, means within each tube to suspend the strands including a plug having an outwardly extending shoulder abutting the flanged end of the tube and an axial bore having a shoulder therein, a cap having an axial opening removably attached to the sleeve with the plug protruding through the opening and abutting the cap, a cylinder secured coaxially to end of the plug and extending toward the strands, a first disc secured to the cylinder having an axial aperture, a second disc confronting the first disc having an axial threaded bore, the strands being secured to the second disc, and a spindle rotatably journaled within the bore of the plug and cylinder having a threaded end engaged within the threaded bore of the second disc, said spindle having a collar thereabout abutting the shoulder of the bore in the plug to maintain the strands in suspension.

References Cited in the file of this patent

Proceedings of the International Conference on the Peaceful Uses of Atomic Energy, vol. 3, Power Reactors. U. N. 1955. Library date December 27, 1955. Held August 8–20, 1955. Pages 103–106, 136–139, 211–220, 297–301, 334–336.